No. 741,552. Patented October 13, 1903.

UNITED STATES PATENT OFFICE.

FRANZ SCHOLL, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

PROCESS OF MAKING AZO DYES.

SPECIFICATION forming part of Letters Patent No. 741,552, dated October 13, 1903.

Application filed February 4, 1903. Serial No. 141,850. (No specimens.)

*To all whom it may concern:*

Be it known that I, FRANZ SCHOLL, Ph. D., a citizen of the Empire of Germany, residing at Höchst-on-the-Main, Germany, have invented certain new and useful Improvements in the Manufacture of Azo Dyestuffs, of which the following is a specification.

In French Patent No. 316,866 orthoamidophenolazo dyestuffs are described which are derived from 1.8-azimidonaphthalene-4-sulfonic acid and are obtained by treating the corresponding azo dyestuffs of 1.8-diamidonaphthalene-4-sulfonic acid with nitrous acid. By the present invention some of these dyestuffs may be obtained in a direct but hitherto-unknown manner by combining the 1.8-azimidonaphthalene-4-sulfonic acid with the diazo compound in the presence of a large excess of alkali. Hitherto the azimidonaphthalene sulfonic acid has been considered to be a body incapable of reaction, (German Patent No. 70,019,) and indeed it has heretofore not been used for the manufacture of azo dyestuffs.

Among the diazo compounds suitable for use in this invention are those of picramic acid of 6-nitro-2-amidophenol-4-sulfonic acid and 4-nitro-2-amidophenol, the manufacture of dyestuffs being illustrated, for instance, as follows: 25.6 kilos of 6-nitro-2-amidophenol-4-sulfonate of sodium are diazotized with seven kilos of sodium nitrite and thirty kilos of hydrochloric acid of 20° Baumé specific gravity. The yellow diazo solution is run into a solution of twenty-six kilos of 1.8-azimidonaphthalene-4-sulfonic acid and sixty kilos of sodium carbonate in about six hundred liters of water. The color of the mixture, at first yellow, becomes green and finally blue. After some time the mass is slowly heated and salted out with the requisite quantity of common salt. The dyestuff separates as crystals.

The manufacture of other dyestuffs by this invention is quite similar if the diazo compounds of 22.1 kilos of picraminate of sodium or 15.4 kilos of nitroamidophenol are used. The dyestuffs separate then mostly as crystals without addition of common salt.

The dyestuffs thus obtained are identical with the corresponding combinations obtained by French Patent No. 316,866. They coincide as regards properties and advantages.

Having now described my invention, what I claim is—

The herein-described process for the manufacture of azo dyestuffs, which consists in causing the diazo compounds of orthoamidophenol derivatives to act on 1.8-azimidonaphthalene-4-sulfonic acid in an alkaline solution, substantially as set forth.

In testimony that I claim the foregoing as my invention I have signed my name in presence of two subscribing witnesses.

FRANZ SCHOLL.

Witnesses:
ALFRED BRISBOIS,
JOHANN HARTENSTEIN.